United States Patent [19]

Kishine et al.

[11] Patent Number: 4,716,078
[45] Date of Patent: Dec. 29, 1987

[54] SUBSTRATE FOR A MAGNETIC DISC AND METHOD MANUFACTURING SAME

[75] Inventors: Nobuyuki Kishine; Tetsuya Imamura, both of Tochigi; Michihide Yamauchi, Wakayama, all of Japan

[73] Assignee: KAO Corporation, Tokyo, Japan

[21] Appl. No.: 638,770

[22] Filed: Aug. 8, 1984

[30] Foreign Application Priority Data

Aug. 8, 1983 [JP] Japan .................. 58-144576

[51] Int. Cl.$^4$ ............................................. G11B 7/04
[52] U.S. Cl. ...................... 428/336; 360/135; 427/128; 427/129; 204/192.2; 428/323; 428/408; 428/694; 428/695; 428/900; 523/468; 523/512; 524/495; 524/496
[58] Field of Search ........... 428/694, 408, 695, 336, 428/220, 900, 323; 427/129, 128, 131, 132; 360/135; 204/192 M; 523/468, 512, 181; 524/495, 496

[56] References Cited

U.S. PATENT DOCUMENTS

| | | | |
|---|---|---|---|
| 2,188,667 | 1/1940 | Stoekle | 427/129 |
| 3,135,949 | 6/1964 | Whyte | 360/135 |
| 3,420,756 | 1/1969 | Terajima | 428/900 |
| 3,476,586 | 11/1969 | Vattchou | 428/408 |
| 3,553,010 | 1/1971 | Rubisch | 428/408 |
| 3,854,979 | 12/1974 | Rossi | 428/408 |
| 4,254,189 | 3/1981 | Fisher | 427/131 |
| 4,398,659 | 8/1983 | Richter | 428/408 |
| 4,415,942 | 11/1983 | Frosch | 360/135 |
| 4,490,201 | 12/1984 | Leeds | 428/408 |
| 4,598,017 | 7/1986 | Bayer | 428/408 |

*Primary Examiner*—Ellis P. Robinson
*Attorney, Agent, or Firm*—Cushman, Darby & Cushman

[57] ABSTRACT

A substrate for magnetic discs, which are to be used as external storage in data processors, is formed from glass-like carbon materials by themselves or contained in a thermosetting resin matrix. The glass-like carbon materials have excellent thermal resistance, can be finished to a mirror-like surface, and have less surface defects than aluminum substrates. Magnetic materials can be adhered directly onto the surface of such substrates shaped in the form of a disc. The resulting disc has good hardness, is resistant to elevated temperatures, is less likely to deform, and is low in cost.

11 Claims, No Drawings

SUBSTRATE FOR A MAGNETIC DISC AND METHOD MANUFACTURING SAME

The present invention relates to a disc substrate used in magnetic memories for data processors.

BACKGROUND OF THE INVENTION

The demand for high-density, large capacity and quick-access data processors has been keenly felt in recent years and various studies are being carried out on the data storage and reproduction methods. Along with such developments, the demand for magnetic discs used in these memories has increased.

Magnetic memory systems have been widely used where magnetic discs are used as an external storage medium. The typical magnetic disc which is widely used is made by coating a thin iron oxide layer on an aluminum substrate. In the fabrication of such magnetic disc, an aluminum substrate is ground and polished to give it a mirror-like surface, then coated with an iron oxide-containing paint and afterwards ground again to achieve a flat surface, such that the resulting magnetic disc has a flat, smooth surface.

The disc substrate used for a high-density magnetic recording medium is in particular required to be processed with a high degree of precision in order to reduce the surface roughness to 0.03 $\mu$m or less as well as to minimize the number of minute recessions or projections on the surface. However, undulation occurs on the aluminum substrate if it is subjected to a levelling treatment for a long time, and as a result it becomes impossible to reduce the gap between a magnetic head and the disc or to obtain a sufficiently smooth surface. Therefore, the aluminum substrate surface is converted into alumite, ground to obtain a mirror-like surface, and a magnetic layer is formed on the ground alumite surface.

In recent years, so-called sputtered discs have been offered as a magnetic disc capable of high-density memory. Such a sputtered disc is fabricated by growing a magnetic material, such as iron oxide, directly on a substrate as a continuous magnetic thin layer with the sputtering method. An aluminum substrate having alumite surface is mainly employed as the substrate for such a high-density memory sputtered disc. In the manufacturing process, iron is sputtered to form $\alpha$-$Fe_3O_4$ on the alumite surface, and the $\alpha$-$Fe_3O_4$ is converted into $\gamma$-$Fe_2O_3$. For this purpose it is necessary to heat the alumite substrate to about 350° C. to 400° C. to achieve the necessary oxidation/reduction. As the thermal expansion coefficient of aluminum is about 5 times higher than alumite, even if the alumite surface has been given a mirror-like surface, cracks often appear during the process of forming the magnetic layer. The substrates having cracks cannot be used for magnetic discs. An attempt has been made, for instance as described in Japanese Laid-Open Patent Application No. 56-94521, to improve the thermal resistance by coating the aluminum surface with a polyamide resin or a silicone resin. In this case, however, the manufacturing cost necessarily increases as additional processing steps and equipment are needed to apply and cure the resinous layer.

The present invention aims at providing a substrate for discs to be used in magnetic memories which substrate has a thermal resistance sufficient to withstand the high temperatures required for thermal treatment in the memory layer growth process. The substrate can be processed to a mirror-like surface, has a satisfactory smoothness with minimum surface defects, is light in weight, and has a high corrosion resistance.

DETAILED DESCRIPTION OF THE INVENTION

The substrate for discs to be used in magnetic memories according to this invention is characterized in that the substrate is formed of a glass-like carbon or is a composite including this glass-like carbon.

The disc substrate according to the present invention is made of glass-like carbon or is a composite including glass-like carbon. Such a glass-like carbon includes the materials obtained by carbonizing or pyrolizing a thermosetting resin, a resin which has been modified to be thermosetting by copolymerization or copolycondensation, a resin obtained by carbonizing a thermoplastic resin which is modified to be amorphous by chemical treatment, or obtained by thermal decomposition of low molecular weight hydrocarbons such as methane, ethylene, benzene, etc., in vapor phase. More specifically, the glass-like carbon materials are preferably of polyacrylonitrile origin, rayon origin, pitch origin, lignin origin, phenol origin, furan origin, alkyd resin origin, unsaturated polyester resin origin, xylene resin origin, and the like.

The composite including the glass-like carbon as used in the present invention means the group of composites containing the glass-like carbon as described above together with synthetic resins and/or carbon fillers. The synthetic resins may be selected from the group consisting of thermoplastic resins, such as polyvinyl chloride, polyvinyl acetate, and polystyrene resins. It may also be selected from the following group of thermosetting resins including phenol resin, epoxy resin, polyester resin, furan resin, urea resin, melamine resin, alkyd resin, and xylene resin, as illustrative materials. The carbon fillers are used herein mean general carbon materials and may be, for instance, a natural substance having a high residual carbon ratio, such as lignin or pitch, man-made graphite obtained by the pyrolysis thermal plastic resins, carbon black manufactured by the furnace or impingement process, or naturally produced graphite.

Thermosetting resins are used as a binder for binding the glass-like carbon or a glass-like carbon with a carbon filler. By compounding thermosetting resins, a composite having a higher mechanical strength against destructive forces, such as impact force, is obtained. When the glass-like carbon is made by carbonizing thermosetting resins, carbonization is more easily carried out by mixing the above-mentioned carbon filler with thermosetting resins. However, if a large amount of carbon filler is added in the glass-like carbon, the quality becomes uneven. It is therefore preferable that the amount of glass-like carbon to be included in the composite should be about 40 volume % or higher, preferably at least 50 volume % or higher.

The magnetic disc substrate according to the invention comprises a glass-like carbon and/or a composite including a glass-like carbon. The substrate may be formed by cast molding, compression molding, injection molding or any other known molding method.

The disc substrate according to this invention is preferably made of glass-like carbon and/or a composite including glass-like carbon which has the minimum number of voids. In order to obtain such glass-like carbon by cast molding, a hardener is uniformly dispersed in the resins, or the resins containing a hardener are uniformly heated, and the hardening speed is controlled to maintain same at a low rate at the stage of obtaining a precursor of the glass-like carbon (where a thermosetting resin is set either thermally or with a hardener), such a preferable aggregate is obtained by wetting the carbon materials or composite materials with a thermosetting resin so as to minimize the number of voids as much as possible.

Unlike prior substrates, the disc substrate of this invention enables the manufacture of a disc capable of high-density memory without the need for any special surface treatment prior to application of the magnetic layer. The material is conveniently molded directly into the shape desired. No layer intermediate between the substrate and the thin film of magnetic material is required.

While the above description is concerned primarily with magnetic disc substrates, similar problems occur in the substrates for optical magnetic discs. As optical magnetic discs are used for reproduction at high speeds in the range of 1800 rpm, such discs require materials for a supplementary substrate which are light in weight and have an extremely flat, smooth surface. Based on these similar requirements, it is also within the ambit of the present invention to include disc substrates for optical memory/reproduction.

The magnetic disc substrate according to this invention has sufficient thermal resistance and a flat, smooth surface, and can be used as a disc substrate for optical memory/reproduction without requiring any special treatment on the surface thereof. Moreover, the disc substrate according to this invention has a high durability as it is highly corrosion-resistant and chemically stable.

EXAMPLES OF THE INVENTION

In order to explain more specifically the disc substrate according to this invention, the following examples are given. The examples below are given merely for illustration and should be by no means construed to limit the technical scope of this invention.

EXAMPLE 1

A mass of glass-like carbon having an apparent specific gravity of 1.50, a Shore hardness of 110, and a thermal expansion coefficient of $3 \times 10^{-6} (°C.)^{-1}$ was cut out in the shape of a disc 130 mm in diameter and 2 mm in thickness. This disc ground on the surface first with coarse alumina powder (1 $\mu$m grain diameter) and finally ground to mirror-like surface with fine alumina powder (0.25 $\mu$m grain diameter). The surface was cleaned by immersing the material in solvent (Freon) at about 20° C. for 10 minutes. The smoothness of the disc substrate surface was measured using a roughness gauge (Surf-Com from Tokyo Seimitsu Kabushiki Kaisha).

The degree of surface defects was checked by observing the surface with an optical microscope and the number of voids having a diameter of 2 $\mu$m or larger within a given field was counted. The following Table shows the results of these tests.

The thermal resistance of the substrate was then checked by placing it in an electric furnace at 800° C., where it was maintained for 1 hour. The substrate was then taken out of the furnace, cooled to room temperature, and the surface was inspected visually. No change was observed before or after heating. When the substrate was examined for smoothness and the number of voids checked using the above-mentioned method, there was no change observed. The thermal resistance of this substrate was confirmed to withstand a temperature of 800° C. and it is believed the substrate could withstand even higher temperatures.

An $\alpha$-Fe$_3$O$_4$ film was grown using a reaction sputtering method on said substrate, reduced in a hydrogen atmosphere at 310° C. to obtain a Fe$_3$O$_4$ layer, and oxidized in air at 310° C. to finally obtain a $\gamma$-Fe$_2$O$_3$ layer of about 1 $\mu$m in thickness. When the thus obtained layer was examined for magnetic characteristics, it was found that the layer had preferable characteristics as a high-density memory medium with about 700 Oe in coercive force (He), a square ratio of 0.77 or higher, and a residual magnetic flux density (Br) of about 2500.

EXAMPLE 2

Ninety volume % of a thermosetting resin, which was made from furfuryl alcohol, formalin and phenol, and 10 volume % of carbon black powder of a mean diameter of 0.10 $\mu$m were mixed, hardened and carbonized to obtain a composite article having included therein glass-like carbon. The thus obtained material was cut into a shape identical to that obtained by Example 1 and surface-trated similarly to obtain a magnetic disc substrate. The resultant substrate was measured in a manner similar to Example 1 for surface roughness and the number of voids having a diameter of 2 $\mu$m or larger recorded. The Table below shows the results of such measurements. Using the same method as Example 1, the thermal resistance was examined and was also found sufficient to withstand a temperature of 800° C.

Using the method similar to Example 1, a $\gamma$-Fe$_2$O$_3$ film was formed on the substrate about 1 $\mu$m in thickness and the magnetic characteristics of the layer were examined. The result showed that the layer had magnetic characteristics substantially similar to the layer obtained in the procedure of Example 1.

COMPARATIVE EXAMPLE

Aluminum stock (of at least 99.9% purity) was cut out into a shape identical to that of Example 1 and the surface treated by anodic oxidation to form an alumite surface. Next, the surface was washed thoroughly with water, immersed in ethyl alcohol, and then dried at 100° C. to completely remove water from the voids in the alumite surface.

The surface was treated using the same method as Example 1 to obtain a magnetic disc substrate. The surface roughness and the number of voids of a diameter of 2 $\mu$m or larger were measured. The Table below shows the results of these observations.

The substrate was then placed in an electric furnace for 1 hour at 310° C., this temperature being optimum for sputtering and oxidation/reduction conditions. It was taken out of the furnace and cooled to room temperature. The surface was inspected with an optical microscope and numerous cracks were found. The thermal resistance was found to be less than 310° C.

The results of the two Examples in accordance with the present invention and the Comparative Example not according to the present invention are as follows:

TABLE

| | Example 1 | Example 2 | Comparative Example |
|---|---|---|---|
| surface roughness ($\mu$m) | 0.005 | 0.008 | 0.020 |
| surface defects* | 5 | 10 | 30 |
| thermal resistance | 800° C. or | 800° C. or | 310° C. or |

TABLE-continued

|  | Example 1 | Example 2 | Comparative Example |
|---|---|---|---|
|  | higher | higher | lower |

*This figure indicates number of voids having a diameter of 2 μm or larger existing on the surface of a piece of disc as counted by an optical microscope.

What is claimed is:

1. A thermal-resistant magnetic memory storage disc comprising:
    a disc of a non-magnetic, molded, glass-like carbon substrate having a flat, smooth, mirror-like surface, and
    a continuous, thin film of magnetic material deposited on the smooth surface of said substrate.

2. The magnetic memory storage disc of claim 1 in which the substrate is a composite material comprising at least 40 volume percent glass-like carbon and the balance consisting essentially of at least one thermosetting resin.

3. The magnetic memory storage disc of claim 1 capable of withstanding temperatures of at least 350° C.

4. The magnetic memory storage disc of claim 1 in which the glass-like carbon in the substrate includes a carbonized thermosetting resin.

5. The magnetic memory storage disc of claim 1 in which the glass-like carbon in the substrate includes a carbonized, amorphous thermoplastic resin.

6. The magnetic memory storage disc of claim 2 in which the composite forming the substrate also contains carbon particle fillers.

7. A magnetic disc substrate molded from a hard, glass-like carbon and having at least one smooth, flat, mirror-like surface; said substrate capable of withstanding temperatures in excess of 350° C.

8. A magnetic disc substrate molded from a composite containing at least 40 volume percent glass-like carbon particles in a thermosetting resin matrix.

9. The magnetic disc substrate of claim 8 which additionally contains carbon particle fillers.

10. The magnetic memory storage disc according to claim 1 wherein said film is deposited on said substrate by a reaction sputtering method.

11. The magnetic memory storage disc according to claim 10 wherein said film is about 1 μm in thickness.

* * * * *